United States Patent [19]

Wendling

[11] Patent Number: 5,242,195
[45] Date of Patent: Sep. 7, 1993

[54] TELESCOPICALLY LENGTH VARIABLE STEERING COLUMN

[75] Inventor: Reiner Wendling, Koblenz, Fed. Rep. of Germany

[73] Assignee: Stabilus GmbH, Koblenz-Neuendorf, Fed. Rep. of Germany

[21] Appl. No.: 800,163

[22] Filed: Nov. 27, 1991

[30] Foreign Application Priority Data

Nov. 29, 1990 [DE] Fed. Rep. of Germany ....... 4038010

[51] Int. Cl.⁵ ............... B62D 1/19; F15B 11/02; F15B 15/14
[52] U.S. Cl. ................... 280/777; 280/753; 180/300; 74/493
[58] Field of Search ............... 280/775, 777; 74/493; 188/300

[56] References Cited

U.S. PATENT DOCUMENTS

| | | | |
|---|---|---|---|
| 2,549,345 | 4/1951 | Tamboli | 74/493 |
| 2,639,626 | 5/1953 | Snyder | 74/493 |
| 3,570,832 | 3/1971 | Ortheil | 267/64 |
| 3,737,003 | 6/1973 | Beals et al. | 180/78 |
| 4,209,074 | 6/1980 | York | 180/78 |
| 4,337,967 | 6/1982 | Yoshida et al. | 280/777 |
| 4,392,670 | 7/1983 | Schultz | 280/775 |
| 4,516,440 | 5/1985 | Nishikawa | 74/493 |
| 4,785,921 | 11/1988 | Hosan et al. | 188/300 |
| 4,993,522 | 2/1991 | Wagner | 188/269 |
| 5,071,163 | 12/1991 | Heinrichs et al. | 280/775 |
| 5,113,716 | 5/1992 | Dumschat | 74/493 |

FOREIGN PATENT DOCUMENTS

| | | |
|---|---|---|
| 0317791 | 5/1989 | European Pat. Off. . |
| 0347921 | 12/1989 | European Pat. Off. . |
| 0417730 | 3/1991 | European Pat. Off. . |
| 1941991 | 2/1970 | Fed. Rep. of Germany . |
| 1630302 | 6/1971 | Fed. Rep. of Germany . |
| 2417543 | 10/1975 | Fed. Rep. of Germany . |
| 2548022 | 5/1976 | Fed. Rep. of Germany . |
| 2501752 | 7/1976 | Fed. Rep. of Germany . |
| 3536285 | 4/1987 | Fed. Rep. of Germany . |
| 264894 | 2/1989 | Fed. Rep. of Germany . |
| 3902882 | 8/1990 | Fed. Rep. of Germany . |
| 3930372 | 3/1991 | Fed. Rep. of Germany . |
| 8001478 | 7/1980 | PCT Int'l Appl. . |

Primary Examiner—Kenneth R. Rice
Attorney, Agent, or Firm—Brumbaugh, Graves, Donohue & Raymond

[57] ABSTRACT

A steering column comprises a pressure tube and a piston rod extending inwards and outwards of said pressure tube. The outer end of the piston rod is connected with a steering wheel. The pressure tube at its end remote from said steering wheel is connected with a steering mechanism of a motor vehicle. The pressure tube is rotatably mounted in a bearing tube. The piston rod is axially movable but non-rotatable with respect to the pressure tube. A liquid chamber is confined within the pressure tube and has a variable volume dependent on the axial position of the piston rod with respect to the pressure tube. The liquid chamber is connectable through a pivotal connection selectively with a pressure liquid source or with a pressure liquid receiving space or can be separated from both of them. A spring acts on the piston rod and is in balance with the liquid in the fluid chamber.

96 Claims, 2 Drawing Sheets

TELESCOPICALLY LENGTH VARIABLE STEERING COLUMN

BACKGROUND OF THE INVENTION

In motor vehicles having a steering column, it is desirable to allow a length adjustment of the steering column, such as to adapt the position of the steering wheel to the personal requirements of the driver.

STATEMENT OF THE PRIOR ART

From U.S. Pat. No. 4,516,440 it is known to provide a steering column comprising two telescopical and torque transmitting elements which can be locked in a plurality of positions.

From German Offenlegungsschrift 39 02 882 and U.S. Pat. No. 4,993,522 it is known to use a blockable gas spring as a positioning device for the head adjustment of a steering column in a motor vehicle.

OBJECT OF THE INVENTION

It is an object of the present invention to provide a telescopically length variable steering column arrangement which allows length adjustment with a minimum of manual force.

A further object of the present invention is to provide a length variable steering column in which an operating fluid can be used both for length adjustment and for damping of a moving occurring in response to a predetermined overload in case of an accident.

A further object of the present invention is to provide a mechanical construction of a steering column which is composed of easily available components, further allows an easy assembling and is reliable in use.

SUMMARY OF THE INVENTION

A telescopically length variable steering column arrangement for a motor vehicle has an axis and comprises at least two telescopically and torque transmittingly interengaging steering column elements rotatably mounted in a bearing system. A steering wheel is allocated to one of said steering column elements for connection with steering means controlling the steering movement of at least one vehicle wheel. Fluid operated locking means are provided for locking said steering column elements in a plurality of selectable relative axial positions. The fluid operated locking means comprise means defining at least one fluid chamber of variable volume within at least one of the steering column elements. Fluid connection means are provided for filling the fluid chamber with an operational fluid or permitting outflow of the operational fluid from the fluid chamber. Moreover, fluid exchange between the fluid chamber and at least one further fluid containing space can be prevented in order to lock a selected relative position of the steering column element.

The fluid chamber may be selectively connectable by control valve means with a fluid supply source or with a fluid receiving space. Further, the fluid chamber can be separated from both the fluid supply source and the fluid receiving space.

The fluid chamber may be subdivided into two partial fluid chambers by a floating separating wall. In this case, a first one of the partial chambers may be filled with a constant volume of fluid, and a second one of the partial chambers may be selectively connected with the fluid supply source or the fluid receiving space or may be separated from both the fluid supply source and the fluid receiving space.

The fluid chamber may be provided with excess pressure exit means permitting escape of fluid from the fluid chamber in response to a predetermined axial load acting on the steering column arrangement. Such, a securing function may be fulfilled: if in case of an accident, the driver produces a high axial load onto the steering wheel, the excess pressure exit means permit escape of fluid from the fluid chamber. Such, the steering wheel is moved under this load. The movement of the steering wheel can be damped by the fluid escaping through a throttled exit. The construction of the excess pressure exit is variable to a large extent.

In case of a subdivision of the fluid chamber into a first and a second partial fluid chamber as mentioned above, the first partial chamber may be provided with the excess pressure exit means opening in response to occurrence of a predetermined axial load onto the steering column arrangement. Such, it is made sure that the constant volume of fluid of the first partial chamber is always available for damping purposes in case of an accident, even when the second chamber has been emptied to a large extent.

The excess pressure exit means may comprise excess pressure valve means, as they are used e.g. in shock absorbers.

Alternatively, the excess pressure exit means may comprise destroyable closure means adapted for being destroyed in response to a predetermined axial load on the steering column arrangement. In this case, a throttling bore or throttling valve may be in series with the closure means for obtaining a desired damping characteristic.

At least one of the fluid supply source and the fluid receiving space may be located outside the steering column arrangement. In case of a vehicle equipped with a hydraulic pressure system or a gas pressure system, the respective system may be used for operation of the locking means.

The control valve means may also be provided outside the steering column arrangement, e.g. on an instrument board of the vehicle.

Preferably, a liquid, such as a hydraulic oil, is used as an operational fluid.

The fluid supply source may be either a pump or a high pressure reservoir for the respective fluid. The high pressure reservoir may again be supplied by a pump.

The fluid receiving space may be a low pressure reservoir. A pump may be provided between the low pressure reservoir and the fluid supply source.

The length adjustment of the column unit may be performed in both directions by use of the operational fluid, i.e. by filling or withdrawing fluid into different chambers.

According to a preferred embodiment, biasing means are provided biasing the steering column arrangement towards a terminal relative position of the steering column elements, the fluid operated locking means acting against the biasing means. In such an embodiment, the movement in one direction can be performed by filling a fluid into a fluid chamber against the action of the biasing means. The movement in the opposite direction can be performed by the biasing means which can expel the fluid from the fluid chamber through the control valve means.

The biasing means may comprise a helical compression spring, preferably coaxial with the axis of the column.

Preferably, the biasing means bias the steering column arrangement towards a terminal position of the steering column elements corresponding to a minimum operative length of the steering column arrangement. In this case, the steering wheel is locked against movement in the forward driving direction of the respective vehicle at least, when the operational fluid is a hydraulic liquid. Theoretically, the steering wheel can be moved against the action of the biasing means by the operator. As, however, the lengthening movement of the column is performed by a pump or a high pressure reservoir, the biasing means may be selected so strong that the steering wheel is practically fixed in both axial directions. The biasing means may comprise a helical spring under high prestress. Such a prestressed helical spring is characterized by the fact that the spring force along the total stroke of the column arrangement remains substantially constant. This is of importance, because the velocity of movement remains also substantially constant. A similar effect may be obtained by using a gas spring as a biasing means, namely a gas spring having a cylinder and a piston rod with a large diameter of the cylinder and a small diameter of the piston rod.

The steering column arrangement may comprise a pressure tube having an axis substantially coinciding with the axis of the steering column arrangement and two ends. A piston rod member may axially extend through one of the two ends, and a piston unit may be combined with the piston rod member within the pressure tube. The piston unit may be sealingly engaged with an inner circumferential surface of the pressure tube and confine the at least one fluid chamber together with the pressure tube. The term "piston rod member" is to be understood in a broad sense. The piston rod member can be also an extension of the piston unit, which extension has substantially the same diameter as the piston unit.

In such a construction, the fluid chamber may be located on a side of the piston unit remote from the piston rod member. This fluid chamber may again be subdivided by a floating wall member into two partial chambers, with the floating wall member being in sealing engagement with the inner circumferential surface of the pressure tube.

Again, a first one of the partial chambers located nearer to the piston unit may be provided with excess pressure exit means, whereas a second one of the partial chambers located more remote from the piston unit may be selectively connected with a fluid supply source and a fluid receiving space or separated from both of them.

The excess pressure exit means may be connectable with a fluid receiving chamber provided within the piston rod member in response to a predetermined axial load acting onto the steering column arrangement.

The pressure tube may accommodate biasing means biasing the steering column elements towards a terminal relative position. More particularly, the biasing means may comprise a helical compression spring surrounding the piston rod member. This helical compression spring may be supported by the pressure tube or an end wall thereof and act onto the piston unit. Thus, the helical compression spring is housed within an annular chamber between the piston rod member and the pressure tube. This annular chamber may be free of operating fluid and connected with atmosphere.

The pressure tube may be one of the steering column elements, and the piston rod member may be another one of the steering column elements. Thus, a most simple construction is obtained in which the telescopic column elements fulfill simultaneously the function of a cylinder and a piston rod.

According to a preferred embodiment, the piston rod member is connectable with the steering wheel, and the pressure tube is connectable with the steering means.

For torque transmission, the piston rod member may be provided with axially extending spline means engageable with counter-spline means provided adjacent an end portion of the pressure tube.

If the fluid chamber is provided within a component rotatable with the steering wheel, the fluid chamber may be connectable with a fluid supply source and a fluid receiving space through at least one pivotal fluid connection means substantially coaxial with the axis of the column.

More particularly, the fluid chamber may be provided within a pressure tube and may be connectable with at least one of a pressure fluid source and a fluid receiving space by pivotal connection means having a rotor member and a stator member. The rotor member may be connected for common rotation with one of the pressure tube and a piston rod member axially guided therein. The stator member may be substantially stationary with respect to a body work of the respective vehicle. The rotor member and the stator member may be bridged by rotation permitting sealing means, such as slidable sealing means.

The pivotal fluid connection means is preferably provided adjacent an end of the pressure tube remote from the piston rod member.

At least one of the pressure tube and the piston rod member may be rotatably mounted within a bearing tube stationary with respect to a body work of the vehicle. More particularly, the pressure tube may be rotatably mounted within the bearing tube by first bearing means adjacent an end portion of the pressure tube which is remote from the steering wheel and by second bearing means closer to the steering wheel. In this case, the first bearing means may be provided between a terminal shaft on an end wall of the pressure tube remote from the piston rod member and an inner circumferential surface of the bearing tube. Moreover, the terminal shaft may form at least part of a rotor member of pivotal connection means connecting the fluid chamber of the pressure tube with a fluid supply source or a fluid receiving space.

For obtaining a constant velocity of relative movement of the column element during a length adjustment, the fluid chamber may be connected with at least one of the fluid supply source and the fluid receiving space through flow control means providing a substantially constant flow rate.

Considering once more an embodiment in which a receiving chamber is accommodated within a piston rod member, this receiving chamber within the piston rod member may have a volume substantially equal to a volume of a partial chamber of a fluid chamber adjacent the piston unit.

The above-mentioned subdivision of the fluid chamber into some partial chambers offers the considerable advantage that in case of an accident, there is always available a constant damping path.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which.

DETAILED DESCRIPTION OF THE PREFERRED EMBODIMENT

Figure 1:
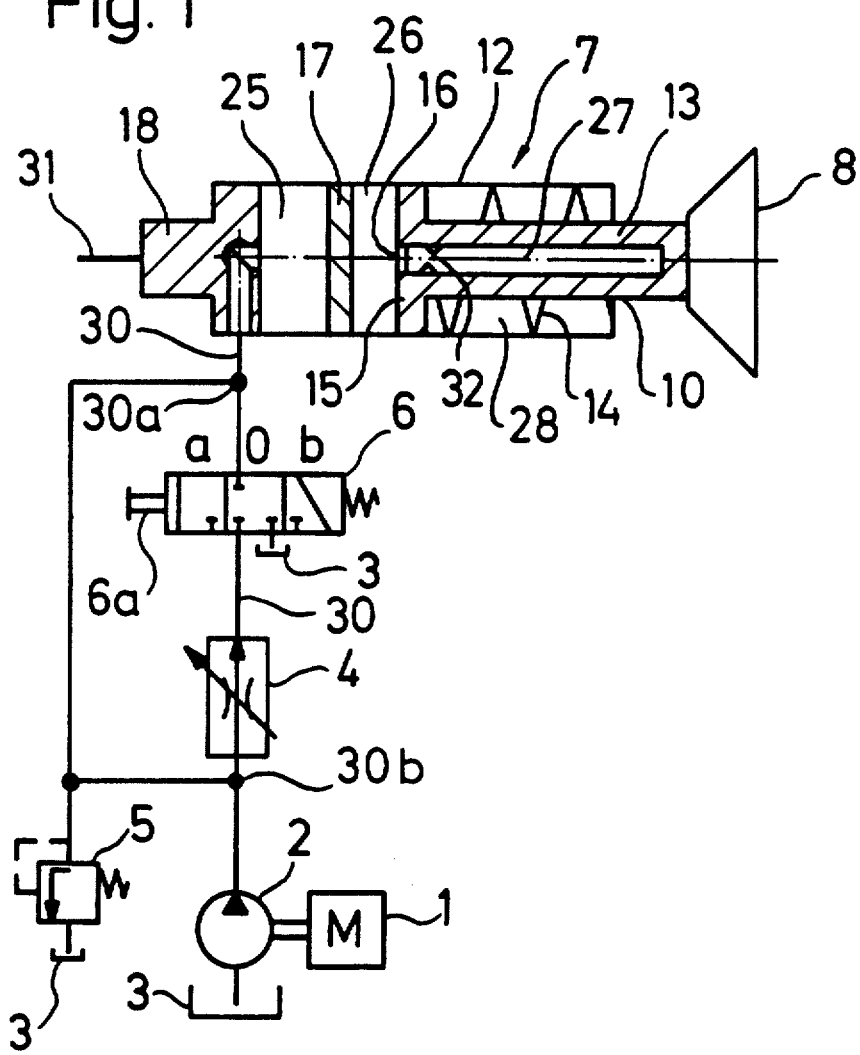
FIG. 1 shows a hydraulic circuit of a steering column arrangement of this invention.

In FIG. 1, a column arrangement 7 comprises a pressure tube 12 and a piston rod 13. The piston rod 13 is provided with a piston unit 15 at the inner end thereof. A steering wheel 8 is fastened to the outer end of the piston rod 13. A fluid chamber 25, 26 is accommodated within the cylinder or pressure tube 12. This fluid chamber 25,26 is sub-divided by a floating separating wall 17 into a first partial chamber 26 and a second partial chamber 25. The second partial chamber 25 is connected through a hydraulic duct 30 with a three-position-control valve 6, a flow control device 4 and a pump 2. The pump 2 is driven by a motor 1, e.g. the motor of a vehicle. The pump 2 receives liquid from a tank 3. An excess pressure valve 5 is connected with the hydraulic duct 30 at 30a at a location between the partial chamber 25 and the control valve 6 and at 30b, i.e. at a location between the flow control device 4 and the pump 2. The pressure tube 12 is connectable by mechanical or electrical transmission means 31 with a steered wheel of a motor vehicle. The control valve 6 is switchable by a control element 6a which may be provided at the instrument board of the vehicle. The piston rod 13 is axially movable with respect to the pressure tube 12. Relative rotation of the piston rod 13 and the pressure tube 12 is prevented by interengaging spline means of the piston rod 13 and the pressure tube 12 at 10. A helical compression spring 14 is accommodated within the annular space 28 confined by the piston rod 13 and the pressure tube 12. The helical compression spring 14 is under axial prestress. In FIG. 1, the control valve 6 is in a middle position O in which the partial chamber 25 is closed. The piston 15 is biased by the helical compression spring 14 to the left and is locked by volumes of liquid contained in the partial chambers 26 and 25. The liquid of volume contained in the partial chamber 26 is always constant in normal operation. If the driver wants to move the steering wheel 8 to the right, he brings the control valve 6 to a second position a, in which the pump 2 is connected through a duct 30 with the partial chamber 25. Such, additional liquid is introduced into the partial chamber 25, and the piston rod 13 is moved to the right against the action of the helical compression spring 14. The prestress of the helical compression spring 14 may be such that it is not possible to pull the piston rod 13 to the right by manual operation. Nevertheless, the biasing force of the helical compression spring 14 can be easily overcome by the pump 2. After the steering wheel 8 has arrived in a desired position, the control valve 6 is again switched into the O-position such that the chamber 25 is again separated from the pump 2. So, the new position of the steering wheel 8 is locked.

If the driver wants to move the steering wheel 8 to the left in FIG. 1, the control valve 6 is brought to the position b such that liquid from the partial chamber 25 can escape into a tank 3. The biasing force of the helical compression spring 14 moves the piston rod 13 to the left; the separating wall 17 follows the movement of the piston rod 13 with the distance between the piston unit 15 and the separating wall 17 remaining constant. The flow rate of the liquid returning to the tank 3 may be controlled by the cross-section of the duct 30 or by a nozzle therein. Alternatively, the flow control device 4 may be located between the control valve 6 and the partial chamber 25 at the exit thereof. Thus, the flow rate to and from the partial chamber 25 may be controlled to a desired substantially constant value both on rightwards movement of the piston rod 13 and on leftwards movement of the piston rod 13. The velocity of the piston rod movement in both directions may be selected at the flow control device 4. As soon as the steering wheel 8 has arrived in a desired position, the control valve 6 is switched to the position O again so that the new position is again locked.

A liquid receiving chamber 27 is provided within the piston rod member 13. This liquid receiving chamber 27 is closed in normal operation by a destroyable disc 16. If in case of an accident, the driver exerts a predetermined leftwards directed force onto the steering wheel 8 by his body being accelerated against the steering wheel 8, the disc 16 is destroyed such that the liquid contained in the partial chamber 26 can enter into the empty receiving chamber 27. This allows the piston rod 13 to move to the left. This leftward movement can be damped by a damping nozzle 32 provided in series with the disc 16. The stroke of the piston rod member 13 in case of an accident is defined by the volume of the partial chamber 26 or the volume of the receiving chamber 27. Preferably, both volumes are substantially equal so that in case of an accident, the piston unit 15 comes into contact with the separating wall 17. Such a constant stroke of the piston rod 13 is available in case of an accident, irrespective of the actual position of the piston rod 13, before the accident occurs.

The pump 2 is provided with a usual excess pressure valve 5 which prevents excess overload of the pump 2. This excess pressure valve 5 may provide an additional stroke in case of an accident, after the receiving chamber 27 has been completely filled.

It is easily understandable that an additional excess pressure valve may be connected to the chamber 25, which is separate from the excess pressure valve 5. It is further evident that the hydraulic duct 30 may be connected to a high pressure tank which is maintained at a substantially constant pressure by the pump 2. This would allow adjustment of the position of the steering wheel 8, even when the motor 1 is at standstill.

Figure 2:
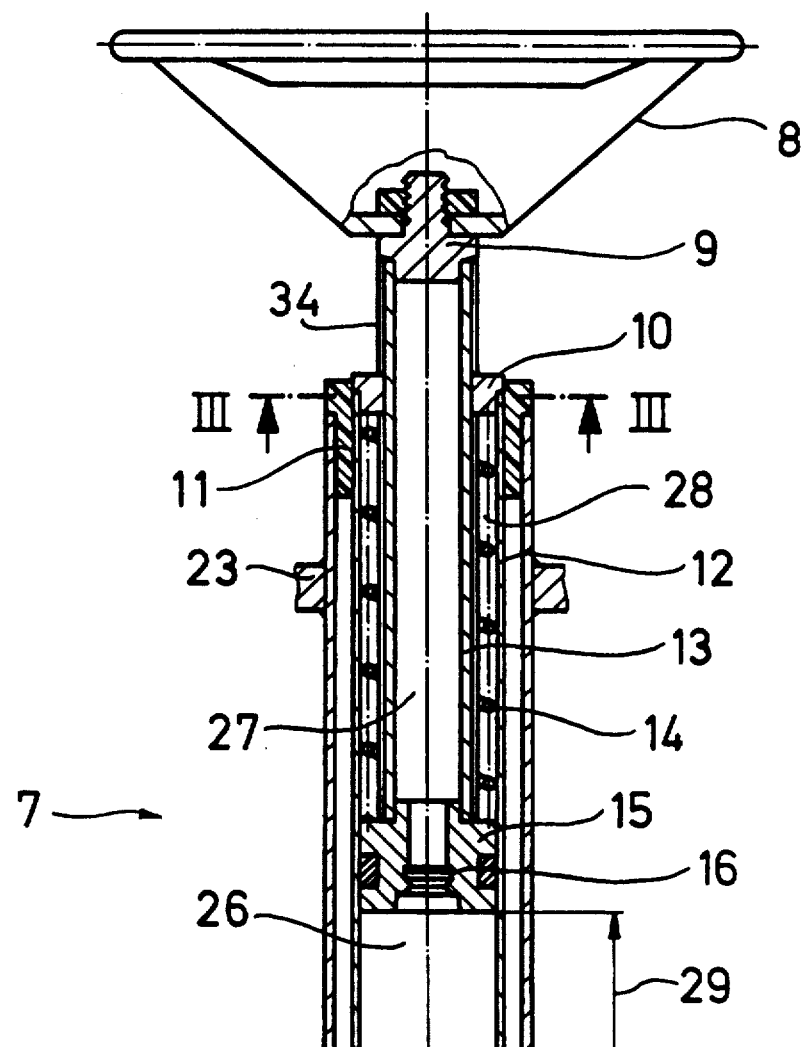
FIG. 2 shows a longitudinal section through the steering column.
Figure 3:
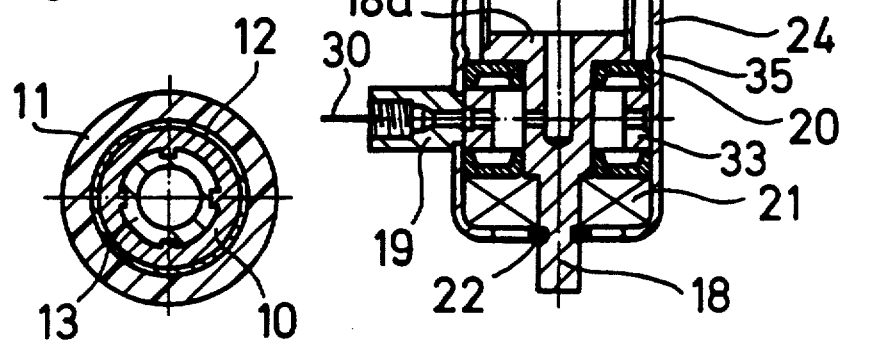
FIG. 3 shows a section according to line III—III of FIG. 2.

The steering column 7 is shown in more detail in FIG. 2. Analogous components are designated by the same reference numerals as in FIG. 1.

The pressure tube 12 is rotatably mounted within a bearing tube 24. This bearing tube 24 is fastened to the body work of the vehicle at 23. The lower end of the pressure tube is provided with a shaft 18. This shaft 18 is part of a bottom wall 18a of the pressure tube 12. The shaft 18 is rotatably mounted in the bearing tube 24 by a roller or ball bearing 21. Moreover, the shaft 18 is axially fixed with respect to the bearing tube 24 by a securing ring 22. The shaft 18 further serves as a rotor member of a pivotal connection unit. This pivotal connection unit further comprises a stator member 33 which is stationary with respect to the bearing tube 24 and with respect to the body work of the vehicle. The stator member 33 and the shaft 18 (rotor member) are bridged by elastic sealing rings 20 sealingly engaging both the shaft 18 and the stator 33. A nipple 19 is connected to the stator 33 so that liquid can flow between the partial chamber 25 and the duct 30. The upper end of the pressure tube 12 is rotatably mounted within the bearing tube 24 by a plastic bearing 11. One further recognizes in FIG. 2 spline means 34 of the piston rod 13, which engage complementary spline means of the cover member 10 fixed to the pressure tube 12.

The piston rod 13 is connected with the steering wheel 8 by a connection member 9. The stroke available for the piston rod 13 in case of an accident after destruction of the closure member 16 is indicated in FIG. 2 at 29. This stroke is constant, irrespective of the actual position of the piston rod 13 before the accident.

The velocity of movement of the piston rod in inwards and outwards direction is constant and can be selected by adjustment of the flow control device 4. Moreover, the helical compression spring 14 is highly prestressed such that the spring force of this spring does not considerably change along the total possible stroke of the piston rod.

The sealing rings 20 are located between the roller bearing 21 and a deformation 35 of the bearing tube 24. The annular space 28 is connected with atmosphere.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A telescopically length variable steering column arrangement for a motor vehicle having an axis and comprising:
    at least two telescopically and torque transmittingly interengaging steering column elements (12,13) rotatably mounted in a bearing system (24,23);
    a steering wheel allocated to one (13) of said steering column elements (12,13) for connection with steering means (31) controlling the steering movement of at least one vehicle wheel;
    fluid operated locking means for locking said steering column elements (12,13) in a plurality of selectable relative axial positions;
    said fluid operated locking means comprising means defining at least one fluid chamber (25,26) of variable volume within at least one (12) of said at least two steering column elements (12,13);
    connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space,
    said fluid chamber (25,26) being selectively connectable by control valve means (6) with a fluid supply source (2) or with a fluid receiving space (3) or being separable from both said fluid supply source (2) and said fluid receiving space (3),
    said at least one fluid chamber (25,26) being subdivided into two partial fluid chambers (25,26) by a floating separating wall (17), a first one (26) of said partial chambers (25,26) being filled with a constant volume of liquid, a second one (25) of said partial chambers (25,26) being selectively connectable with said fluid supply source (2) of said fluid receiving space (3) or being separable from both said fluid supply source (2) and said fluid receiving space (3).

2. The telescopically length variable steering column of claim 1,
    said at least one fluid chamber (25,26) being provided with excess pressure exit means (16,5) permitting escape of fluid from said fluid chamber (25,26) in response to a predetermined axial load acting on said steering column arrangement (7).

3. The telescopically length variable steering column of claim 1,
    said first partial chamber (26) being provided with excess pressure exit means (16) opening in response to occurrence of a predetermined axial load onto said steering column arrangement (7).

4. The telescopically length variable steering column of claim 2,
    said excess pressure exit means (16,5) comprising excess pressure valve means (5).

5. The telescopically length variable steering column of claim 2,
    said excess pressure exit means (16,5) comprising destroyable closure means (16) adapted for being destroyed in response to a predetermined axial load on said steering column arrangement (7).

6. The telescopically length variable steering column of claim 1,
    at least one of said fluid supply source (2) and said fluid receiving space (3) being located outside said steering column arrangement (7).

7. The telescopically length variable steering column of claim 1,
    said control valve means (6) being provided outside said steering column arrangement (7).

8. The telescopically length variable steering column of claim 1,
    said operational fluid being a liquid, such as a hydraulic oil.

9. The telescopically length variable steering column of claim 1,
    said fluid supply source (2) being one of a pump (2) and a high pressure reservoir for a respective fluid.

10. The telescopically length variable steering column of claim 1,
    said fluid receiving space (3) being a low pressure reservoir, a pump being provided between said low pressure reservoir and said fluid supply source.

11. The telescopically length variable steering column of claim 1,
    further comprising biasing means (14) biasing said steering column arrangement (7) toward a terminal relative position of said steering column elements (12,13), said fluid operated locking means acting against said biasing means (14).

12. The telescopically length variable steering column unit of claim 11,
    said biasing means (14) comprising a helical compression spring (14).

13. The telescopically length variable steering column unit of claim 11,
   said biasing means (14) biasing said steering column arrangement (7) toward a terminal position of said steering column elements (12,13) corresponding to a minimum operative length of said steering column arrangement (7).

14. The telescopically length variable steering column unit of claim 1,
   said steering column arrangement (7) comprising a pressure tube (12) having an axis substantially coinciding with said axis of said steering column arrangement (7) and two ends, a piston rod member (13) axially extending through one of said two ends and piston unit (15) combined with said piston rod member (13) within said pressure tube (12), said piston unit (15) being sealingly engaged with an inner circumferential surface of said pressure tube (12) and confining said at least one fluid chamber (25,26) together with said pressure tube (12).

15. The telescopically length variable steering column unit of claim 14,
   said fluid chamber (25,26) being located on a side of said piston unit (15) remote from said piston rod member (13).

16. The telescopically length variable steering column unit of claim 15,
   said fluid chamber (25,26) being subdivided by a floating wall member (17) into two partial chambers (25,26), said floating wall member (17) being in sealing engagement with said inner circumferential surface of said pressure tube (12).

17. The telescopically length variable steering column unit of claim 16,
   a first one (26) of said partial chambers (25,26) located nearer to said piston unit (15) being provided with excess pressure exit means (16).

18. The telescopically length variable steering column unit of claim 17,
   said excess pressure exit means (16) being connectable with a fluid receiving chamber (27) provided within said piston rod member (13) in response to a predetermined axial load acting onto said steering column arrangement (7).

19. The telescopically length variable steering column unit of claim 14,
   said pressure tube (12) accommodating biasing means (14) biasing said steering column elements (12,13) toward a terminal relative position.

20. The telescopically length variable steering column unit of claim 19,
   said biasing means (14) comprising a helical compression spring (14) surrounding said piston rod member (13), said helical compression spring (14) being supported by one of said pressure tube (12) and an end wall (10) thereof and acting onto said piston unit (15), said helical compression spring (14) being housed within an annular chamber (28) between said piston rod member (13) and said pressure tube (12), said annular chamber (28) being free of operating fluid.

21. The telescopically length variable steering column unit of claim 14,
   said pressure tube (12) being one of said steering column elements and said piston rod member (13) being one of said steering column elements.

22. The telescopically length variable steering column unit of claim 14,
   said piston rod member (13) being connectable with said steering wheel (8) and said pressure tube (12) being connectable with said steering means (31).

23. The telescopically length variable steering column unit of claim 14,
   said piston rod member (13) being provided with axially extending spline means (34) engageable with counter-spline means provided adjacent an end portion of said pressure tube (12).

24. The telescopically length variable steering column unit of claim 1,
   said at least one fluid chamber (25,26) being connectable with a fluid supply source (2) and a fluid receiving space (3) through at least one pivotal fluid connection means (33,18) substantially coaxial with said axis.

25. The telescopically length variable steering column unit of claim 24,
   said fluid chamber (25,26) being within a pressure tube (12) and being connectable with at least one of a pressure fluid source (2) and a fluid receiving space (3) by pivotal connection means (18,33) having a rotor member (18) and a stator member (33), said rotor member (18) being connected for a common rotation with one of said pressure tube (12) and a piston rod member (13) axially guided therein, said stator member (33) being substantially stationary with respect to a body work (23) of the respective vehicle, said rotor member (18) and said stator member (33) being bridged by rotation permitting sealing means (20).

26. The telescopically length variable steering column unit of claim 25,
   said rotation permitting sealing means (20) comprising sliding sealing means (20) slidable with respect to at least one of said rotor member (18) and said stator member (33).

27. The telescopically length variable steering column unit of claim 25,
   said pivotal fluid connection means (18,33) being provided adjacent and end of said pressure tube (12) remote from said piston rod member (13).

28. The telescopically length variable steering column unit of claim 14,
   at least one of said pressure tube (12) and said piston rod member (13) being rotatably mounted within a bearing tube (24) stationary with respect to a body work (32) of said vehicle.

29. The telescopically length variable steering column unit of claim 28,
   said pressure tube (12) being rotatably mounted within said bearing tube (24) by first bearing means (21) adjacent an end portion of said portion tube (12) which is remote from said steering wheel (8) and by second bearing means (11) closer to said steering wheel (8).

30. The telescopically length variable steering column unit of claim 29,
   said first bearing means (21) being provided between a terminal shaft (18) of an end wall (18a) of said pressure tube (12) remote from said piston rod member (13) and an inner circumferential surface of said bearing tube (24).

31. The telescopically length variable steering column unit of claim 30,
   said terminal shaft (18) forming at least part of a rotor member (18) of pivotal connection means (18,33) connecting said fluid chamber (25,26) of said pressure tube (12) with at least one of a fluid supply source (2) and a fluid receiving space (3).

32. The telescopically length variable steering column unit of claim 1, said at least one fluid chamber (25,26) being connected with at least one of said fluid supply source (2) and said fluid receiving space (3) through flow control means (4) providing a substantially constant flow rate.

33. The telescopically length variable steering column unit of claim 18, said receiving chamber (27) within said piston rod member (13) having a volume substantially equal to a volume of a partial chamber (26) of said fluid chamber (25,26) adjacent said piston unit (15).

34. The telescopically length variable steering column unit of claim 16, a second one (25) of said partial chambers (25,26) being located more remote from said piston unit (15) than said first one (26) of said partial chambers (25,26), being selectively connectable with one of a fluid supply source (2) and a fluid receiving space (3), and being separable from said fluid supply source (2) and said fluid receiving space (3).

35. A telescopically length variable steering column arrangement for a motor vehicle having an axis and comprising:

at least two telescopically and torque transmittingly interengaging steering column elements (12,13) rotatably mounted in a baring system (24,23);

a steering wheel allocated to one (13) of said steering column elements (12,13) for connection with steering means (31) controlling the steering movement of at least one vehicle wheel;

fluid operated locking means for locking said steering column elements (12,13) in a plurality of selectable relative axial positions;

said fluid operated locking means comprising means defining at least one fluid chamber (25,26) of variable volume within at least one (12) of said at least two steering column elements (12,13);

connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space, said first partial chamber (26) being provided with excess pressure exit means (16) opening in response to occurrence of a predetermined axial load onto said steering column arrangement (7).

36. The telescopically length variable steering column unit of claim 35, said fluid chamber (25,26) being selectively connectable by control valve means (6) with a fluid supply source (2) or with a fluid receiving space (3) or being separable from both said fluid supply source (2) and said fluid receiving space (3).

37. The telescopically length variable steering column unit of claim 36, said at least one fluid chamber (25,26) being subdivided into two partial fluid chambers (25,26) by a floating separating wall (17), a first one (26) of said partial chambers (25,26) being filled with a constant volume of liquid, a second one (25) of said partial chambers (25,26) being selectively connectable with said fluid supply source (2) of said fluid receiving space (3) or being separable from both said fluid supply source (2) and said fluid receiving space (3).

38. The telescopically length variable steering column unit of claim 35, said at least one fluid chamber (25,26) being provided with excess pressure exit means (16,5) permitting escape of fluid from said fluid chamber (25,26) in response to a predetermined axial load acting on said steering column arrangement (7).

39. The telescopically length variable steering column unit of claim 38, said excess pressure exit means (16,5) comprising excess pressure valve means (5).

40. The telescopically length variable steering column unit of claim 38, said excess pressure exit means (16,5) comprising destroyable closure means (16) adapted for being destroyed in response to a predetermined axial load on said steering column arrangement (7).

41. The telescopically length variable steering column unit of claim 36, at least one of said fluid supply source (2) and said fluid receiving space (3) being located outside said steering column arrangement (7).

42. The telescopically length variable steering column unit of claim 36, said control valve means (6) being provided outside said steering column arrangement (7).

43. The telescopically length variable steering column unit of claim 35, said operational fluid being a liquid, such as a hydraulic oil.

44. The telescopically length variable steering column unit of claim 36, said fluid supply source (2) being one of a pump (2) and a high pressure reservoir for a respective fluid.

45. The telescopically length variable steering column unit of claim 36, said fluid receiving space (3) being a low pressure reservoir, a pump being provided between said low pressure reservoir and said fluid supply source.

46. The telescopically length variable steering column unit of claim 35, further comprising biasing means (14) biasing said steering column arrangement (7) toward a terminal relative position of said steering column elements (12,13), said fluid operated locking means acting against said biasing means (14).

47. The telescopically length variable steering column unit of claim 46, said biasing means (14) comprising a helical compression spring (14).

48. The telescopically length variable steering column unit of claim 46, said biasing means (14) biasing said steering column arrangement (7) toward a terminal position of said steering column elements (12,13) corresponding to a minimum operative length of said steering column arrangement (7).

49. The telescopically length variable steering column unit of claim 35, said steering column arrangement (7) comprising a pressure tube (12) having an axis substantially coinciding with said axis of said steering column arrangement (7) with two ends, a piston rod member (13) axially extending through one of said two ends and a piston unit (15) combined with said piston rod member (13) within said pressure tube (12), said piston unit (15) being sealingly engaged with an inner circumferential surface of said pressure tube (12) and confining said at least one fluid chamber (25,26) together with said pressure tube (12).

50. The telescopically length variable steering column unit of claim 49,
said fluid chamber (25,26) being located on a side of said piston unit (15) remote from said piston rod member (13).

51. The telescopically length variable steering column unit of claim 49,
said fluid chamber (25,26) being subdivided by a floating wall member (17) into two partial chambers (25,26), said floating wall member (17) being in sealing engagement with said inner circumferential surface of said pressure tube (12).

52. The telescopically length variable steering column unit of claim 51,
a first one (26) of said partial chambers (25,26) located nearer to said piston unit (15) being provided with excess pressure exit means (16).

53. The telescopically length variable steering column unit of claim 52,
said excess pressure exit means (16) being connectable with a fluid receiving chamber (27) provided within said piston rod member (13) in response to a predetermined axial load acting onto said steering column arrangement (7).

54. The telescopically length variable steering column unit of claim 49,
said pressure tube (12) accommodating biasing means (14) biasing said steering column elements (12,13) toward a terminal relative position.

55. The telescopically length variable steering column unit of claim 54,
said biasing means (14) comprising a helical compression spring (14) surrounding said piston rod member (13), said helical compression spring (14) being supported by one of said pressure tube (12) and on an end wall (10) thereof and acting onto said piston unit (15), said helical compression spring (14) being housed within an annular chamber (28) between said piston rod member (13) and said pressure tube (12), said annular chamber (28) being free of operating fluid.

56. The telescopically length variable steering column unit of claim 49,
said pressure tube (12) being one of said steering column elements and said piston rod member (13) being one of said steering column elements.

57. The telescopically length variable steering column unit of claim 49,
said piston rod member (13) being connectable with said steering wheel (8) and said pressure tube (12) being connectable with said steering means (31).

58. The telescopically length variable steering column unit of claim 49,
said piston rod member (13) being provided with axially extending spline means (34) engageable with counter-spline means provided adjacent an end portion of said pressure tube (12).

59. The telescopically length variable steering column unit of claim 35,
said at least one fluid chamber (25,26) being connectable with a fluid supply source (2) and a fluid receiving space (3) through at least one pivotal fluid connection means (33,18) substantially coaxial with said axis.

60. The telescopically length variable steering column unit of claim 59,
said fluid chamber (25,26) being within a pressure tube (12) and being connectable with at least one of a pressure fluid source (2) and a fluid receiving space (3) by pivotal connection means (18,33) having a rotor member (18) and a stator member (33), said rotor member (18) being connected for common rotation with one of said pressure tube (12) and a piston rod member (13) axially guided therein, said stator member (33) being substantially stationary with respect to a body work (23) of the respective vehicle, said rotor member (18) and said stator member (33) being bridged by rotation permitting sealing means (20).

61. The telescopically length variable steering column unit of claim 60,
said rotation permitting sealing means (20) comprising sliding sealing means (20) slidable with respect to at least one of said rotor member (18) and said stator member (33).

62. The telescopically length variable steering column unit of claim 60,
said pivotal fluid connection means (18,33) being provided adjacent an end of said pressure tube (12) remote from said piston rod member (13).

63. The telescopically length variable steering column unit of claim 49,
at least one of said pressure tube (12) and said piston rod member (13) being rotatably mounted within a bearing tube (24) stationary with respect to a body work (32) of said vehicle.

64. The telescopically length variable steering column unit of claim 63,
said pressure tube (12) being rotatably mounted within said bearing tube (24) by first bearing means (21) adjacent an end portion of said portion tube (12) which is remote from said steering wheel (8) and by second bearing means (11) closer to said steering wheel (8).

65. The telescopically length variable steering column unit of claim 64,
said first bearing means (21) being provided between a terminal shaft (18) of an end wall (18a) of said pressure tube (12) remote from said piston rod member (13) and an inner circumferential surface of said bearing tube (24).

66. The telescopically length variable steering column unit of claim 65,
said terminal shaft (18) forming at least part of a rotor member (18) of pivotal connection means (18,33) connecting said fluid chamber (25,26) of said pressure tube (12) with at least one of a fluid supply source (2) and a fluid receiving space (3).

67. The telescopically length variable steering column unit of claim 36,
said at least one fluid chamber (25,26) being connected with at least one of said fluid supply source (2) and said fluid receiving space (3) through flow control means (4) providing a substantially constant flow rate.

68. The telescopically length variable steering column unit of claim 53,
said receiving chamber (27) within said piston rod member (13) having a volume substantially equal to a volume of a partial chamber (26) of said fluid chamber (25,26) adjacent said piston unit (15).

69. The telescopically length variable steering column unit of claim 51, a second one (25) of said partial chambers (25,26) being located more remote from said piston unit (15) than said first one (26) of said partial chambers (25,26), being selectively connectable with one of a fluid supply source (2) and a fluid receiving space (3), and being separable from said fluid supply source (2) and said fluid receiving space (3).

70. A telescopically length variable steering column arrangement for a motor vehicle having an axis and comprising:

at least two telescopically and torque transmittingly interengaging steering column elements (12,13) rotatably mounted in a bearing system (24,23);

a steering wheel allocated to one (13) of said steering column elements (12,13) for connection with steering means (31) controlling the steering movement of at least one vehicle wheel;

fluid operated locking means for locking said steering column elements (12,13) in a plurality of selectable relative axial positions;

said fluid operated locking means comprising means defining at least one fluid chamber (25,26) of variable volume within at least one (12) of said at least two steering column elements (12,13);

connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space, said steering column arrangement (7) comprising a pressure tube (12) having an axis substantially coinciding with said axis of said steering column arrangement (7) and two ends, a piston rod member (13) axially extending through one of said two ends and a piston unit (15) combined with said piston rod member (13) within said pressure tube (12), said piston unit (15) being sealingly engaged with an inner circumferential surface of said pressure tube (12) and confining said at least one fluid chamber (25,26) together with said pressure tube (12), said fluid chamber (25,26) being subdivided by a floating wall member (17) into two partial chambers (25,26), said floating wall member (17) being in sealing engagement with said inner circumferential surface of said pressure tube (12).

71. The telescopically length variable steering column unit of claim 70, a first one (26) of said partial chambers (25,26) located nearer to said piston unit (15) being provided with excess pressure exit means (16).

72. The telescopically length variable steering column unit of claim 71, said excess pressure exit means (16) being connectable with a fluid receiving chamber (27) provided within said piston rod member (13) in response to a predetermined axial load acting onto said steering column arrangement (7).

73. The telescopically length variable steering column unit of claim 70, said pressure tube (12) accommodating biasing means (14) biasing said steering column elements (12,13) toward a terminal relative position.

74. The telescopically length variable steering column unit of claim 73, said biasing means (14) comprising a helical compression spring (14) surrounding said piston rod member (13), said helical compression spring (14) being supported by one of said pressure tube (12) and an end wall (10) thereof and acting onto said piston unit (15), said helical compression spring (14) being housed within an annular chamber (28) between said piston rod member (13) and said pressure tube (12), said annular chamber (28) being free of operating fluid.

75. The telescopically length variable steering column unit of claim 70, said pressure tube (12) being one of said steering column elements and said piston rod member (13) being one of said steering column elements.

76. The telescopically length variable steering column unit of claim 70, said piston rod member (13) being connectable with said steering wheel (8) and said pressure tube (12) being connectable with said steering means (31).

77. The telescopically length variable steering column unit of claim 70, said piston rod member (13) being provided with axially extending spline means (34) engageable with counter-spline means provided adjacent an end portion of said pressure tube (12).

78. The telescopically length variable steering column unit of claim 70, said at least one fluid chamber (25,26) being connectable with a fluid supply source (2) and a fluid receiving space (3) through at least one pivotal fluid connection means (33,18) substantially coaxial with said axis.

79. The telescopically length variable steering column unit of claim 78, said fluid chamber (25,26) being within a pressure tube (12) and being connectable with at least one of a pressure fluid source 92) and a fluid receiving space (3) by pivotal connection means (18,33) having a rotor member (18) and a stator member (33), said rotor member (18) being connected for common rotation with one of said pressure tube (12) and a piston rod member (13) axially guided therein, said stator member (33) being substantially stationary with respect to a body work (23) of the respective vehicle, said rotor member (18) and said stator member (33) being bridged by rotation permitting sealing means (20).

80. The telescopically length variable steering column unit of claim 70, at least one of said pressure tube (12) and said piston rod member (13) being rotatably mounted within a bearing tube (14) stationary with respect to a body work (32) of said vehicle.

81. The telescopically length variable steering column unit of claim 80, said pressure tube (12) being rotatably mounted within said bearing tube (24) by first bearing means (21) adjacent an end portion of said portion tube (12) which is remote from said steering wheel (8) and by second bearing means (11) closer to said steering wheel (8).

82. The telescopically length variable steering column unit of claim 81, said first bearing means (21) being provided between a terminal shaft (18) of an end wall (18a) of said pressure tube (12) remote from said piston rod member (13) and an inner circumferential surface of said bearing tube (24).

83. The telescopically length variable steering column unit of claim 70,
a second one (25) of said partial chambers (25,26) being located more remote from said piston unit (15) than said first one (26) of said partial chambers (25,26), being selectively connectable with one of a fluid supply source (2) and a fluid receiving space (3), and being separable from said fluid supply source (2) and said fluid receiving space (3).

84. A telescopically length variable steering column arrangement for a motor vehicle having an axis and comprising:
at least two telescopically and torque transmittingly interengaging steering column elements (12,13) rotatably mounted in a bearing system (24,23);
a steering wheel allocated to one (13) of said steering column elements (12,13) for connection with steering means (31) controlling the steering movement of at least one vehicle wheel;
fluid operated locking means for locking said steering column elements (12,13) in a plurality of selectable relative axial positions;
said fluid operated locking means comprising means defining at least one fluid chamber (25,26) of variable volume within at least one (12) of said at least two steering column elements (12,13);
connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space,
said steering column arrangement (7) comprising a pressure tube (12) having an axis substantially coinciding with said axis of said steering column arrangement (7) and two ends, a piston rod member (13) axially extending through one of said two ends and a piston unit (15) combined with said piston rod member (13) within said pressure tube (12), said piston unit (15) being sealingly engaged with an inner circumferential surface of said pressure tube (12) and confining said at least one fluid chamber (25,26) together with said pressure tube (12),
said pressure tube (12) accommodating biasing means (14) biasing said steering column elements (12,13) toward a terminal relative position,
said biasing means (14) comprising a helical compression spring (14) surrounding said piston rod member (13), said helical compression spring (14) being supported by one of said pressure tube (12) and an end wall (10) thereof and acting onto said piston unit (15), said helical compression spring (14) being housed within an annular chamber (28) between said piston rod member (13) and said pressure tube (12), said annular chamber (28) being free of operating fluid.

85. A telescopically length variable steering column arrangement for a motor vehicle having an axis and comprising:
at least two telescopically and torque transmittingly interengaging steering column elements (12,13) rotatably mounted in a bearing system (24,23);
a steering wheel allocated to one (13) of said steering column elements (12,13) for connection with steering means (31) controlling the steering movement of at least one vehicle wheel;
fluid operated locking means for locking said steering column elements (12,13) in a plurality of selectable relative axial positions;
said fluid operated locking means comprising means defining at least one fluid chamber (25,26) of variable volume within at least one (12) of said at least two steering column elements (12,13);
connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space,
said at least one fluid chamber (25,26) being connectable with a fluid supply source (2) and a fluid receiving space (3) through at least one pivotal fluid connection means (33,18) substantially coaxial with said axis,
said fluid chamber (25,26) being within a pressure tube (12) and being connectable with at least one of a pressure fluid source (2) and a fluid receiving space (3) by pivotal connection means (18,33) having a rotor member (18) and a stator member (33), said rotor member (18) being connected for common rotation with one of said pressure tube (12) and a piston rod member (13) axially guided therein, said stator member (33) being substantially stationary with respect to a body work (23) of the respective vehicle, said rotor member (18) and said stator member (33) being bridged by rotation permitting sealing means (20).

86. The telescopically length variable steering column unit of claim 85,
said rotation permitting sealing means (20) comprising sliding sealing means (20) slidable with respect to at least one of said rotor member (18) and said stator member (33).

87. The telescopically length variable steering column unit of claim 85,
said pivotal fluid connection means (18,33) being provided adjacent an end of said pressure tube (12) remote from said piston rod member (13).

88. A telescopically length variable steering column arrangement for a motor vehicle having an axis and comprising:
at least two telescopically and torque transmittingly interengaging steering column elements (12,13) rotatably mounted in a bearing system (24,23);
a steering wheel allocated to one (13) of said steering column elements (12,13) for connection with steering means (31) controlling the steering movement of at least one vehicle wheel;
fluid operated locking means for locking said steering column elements (12,13) in a plurality of selectable relative axial positions;
said fluid operated locking means comprising means defining at least one fluid chamber (25,26) of variable volume within at least one (12) of said at least two steering column elements (12,13);
connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space,
said steering column arrangement (7) comprising a pressure tube (12) having an axis substantially coinciding with said axis of said steering column arrangement (7) with two ends, a piston rod member (13) axially extending through one of said two ends and a piston unit (15) combined with said piston rod member (13) within said pressure tube (12), said piston unit (15) being sealingly engaged with an inner circumferential surface of said pressure tube (12) and confining said at least one fluid chamber (25,26) together with said pressure tube (12), at least one of said pressure tube (12) and said piston rod member (13) being rotatably mounted within a bearing tube (24) stationary with respect to a body work (32) of said vehicle, said pressure tube (12) being rotatably mounted within said bearing tube (24) by first bearing means (21) adjacent an end portion of said portion tube (12) which is remote from said steering wheel (8) and by second bearing means (11) closer to said steering wheel (8).

89. The telescopically length variable steering column unit of claim 88, said first bearing means (21) being provided between a terminal shaft (18) of an end wall (18a) of said pressure tube (12) remote from said piston rod member (13) and an inner circumferential surface of said bearing tube (24).

90. The telescopically length variable steering column unit of claim 89, said terminal shaft (18) forming at least part of a rotor member (18) of pivotal connection means (18,33) connecting said fluid chamber (25,26) of said pressure tube (12) with at least one of a fluid supply source (2) and a fluid receiving space (3).

91. A telescopically length variable steering column arrangement for a motor vehicle having an axis and comprising:

at least two telescopically and torque transmittingly interengaging steering column elements (12,13) rotatably mounted in a bearing system (24,23);

a steering wheel allocated to one (13) of said steering column elements (12,13) for connection with steering means (31) controlling the steering movement of at least one vehicle wheel;

fluid operated locking means for locking said steering column elements (12,13) in a plurality of selectable relative axial positions;

said fluid operated locking means comprising means defining at least one fluid chamber (25,26) of variable volume within at least one (12) of said at least two steering column elements (12,13);

connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space, said steering column arrangement (7) comprising a pressure tube (12) having an axis substantially coinciding with said axis of said steering column arrangement (7) with two ends, a piston rod member (13) axially extending through one of said two ends and a piston unit (15) combined with said piston rod member (13) within said pressure tube (12), said piston unit (15) being sealingly engaged with an inner circumferential surface of said pressure tube (12) and confining said at least one fluid chamber (25,26) together with said pressure tube (12), said fluid chamber (25,26) being subdivided by a floating wall member (17) into two partial chambers (25,26), said floating wall member (17) being in sealing engagement with said inner circumferential surface of said pressure tube (12), a first one (26) of said partial chambers (25,26) located nearer to said piston unit (15) being provided with excess pressure exit means (16), said excess pressure exit means (16) being connectable with a fluid receiving chamber (27) provided within said piston rod member (13) in response to a predetermined axial load acting onto said steering column arrangement (7), said receiving chamber (27) within said piston rod member (13) having a volume substantially equal to a volume of a partial chamber (26) of said fluid chamber (25,26) adjacent said piston unit (15).

92. A telescopically length variable steering column arrangement for a motor vehicle having an axis and comprising:

at least two telescopically and torque transmittingly interengaging steering column elements (12,13) rotatably mounted in a bearing system (24,23);

a steering wheel allocated to one (13) of said steering column elements (12,13) for connection with steering means (31) controlling the steering movement of at least one vehicle wheel;

fluid operated locking means for locking said steering column elements (12,13) in a plurality of selectable relative axial positions;

said fluid operated locking means comprising means defining at least one fluid chamber (25,26) of variable volume within at least one (12) of said at least two steering column elements (12,13);

connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space, said fluid chamber (25,26) being selectively connectable by control valve means (6) with a fluid supply source (2) or with a fluid receiving space (3) or being separable with both said fluid supply source (2) and said fluid receiving space (3).

93. A telescopically length variable steering column arrangement for a motor vehicle having an axis and comprising:

at least two telescopically and torque transmittingly interengaging steering column elements (12,13) rotatably mounted in a bearing system (24,23);

a steering wheel allocated to one (13) of said steering column elements (12,13) for connection with steering means (31) controlling the steering movement of at least one vehicle wheel;

fluid operated locking means for locking said steering column elements (12,13) in a plurality of selectable relative axial positions;

said fluid operated locking means comprising means defining at least one fluid chamber (25,26) of variable volume within at least one (12) of said at least two steering column elements (12,13);

connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space, said fluid chamber (25,26) being selectively connectable by control valve means (6) with a fluid supply source (2) or with a fluid receiving space (3) or being separable from both said fluid supply source (2) and said fluid receiving space (3), said fluid receiving space (3) being a low pressure reservoir, a pump being provided between said low pressure reservoir and said fluid supply source.

94. A telescopically length variable steering column arrangement for a motor vehicle having an axis and comprising:

at least two telescopically and torque transmittingly interengaging steering column elements (12,13) rotatably mounted in a bearing system (24,23);

a steering wheel allocated to one (13) of said steering column elements (12,13) for connection with steering means (31) controlling the steering movement of at least one vehicle wheel;

fluid operated locking means for locking said steering column elements (12,13) in a plurality of selectable relative axial positions;

said fluid operated locking means comprising means defining at least one fluid chamber (25,26) of variable volume within at least one (12) of said at least two steering column elements (12,13);

connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space, said fluid chamber (25,26) being selectively connectable by control valve means (6) with a fluid supply source (2) or with a fluid receiving space (3) or being separable from both said fluid supply source (2) and said fluid receiving space (3), said fluid receiving space (3) being a low pressure reservoir, a pump being provided between said low pressure reservoir and said fluid supply source, further comprising biasing means (14) biasing said steering column arrangement (7) toward a terminal relative position of said steering column elements (12,13), said fluid operated locking means acting against said biasing means (14), said biasing means (14) biasing said steering column arrangement (7) toward a terminal position of said steering column elements (12,13) corresponding to a minimum operative length of said steering column arrangement (7).

95. A telescopically length variable steering column arrangement for a motor vehicle having an axis and comprising:

at least two telescopically and torque transmittingly interengaging steering column elements (12,13) rotatably mounted in a bearing system (24,23);

a steering wheel allocated to one (13) of said steering column elements (12,13) for connection with steering means (31) controlling the steering movement of at least one vehicle wheel;

fluid operated locking means for locking said steering column elements (12,13) in a plurality of selectable relative axial positions;

said fluid operated locking means comprising means defining at least one fluid chamber (25,26) of variable volume within at least one (12) of said at least two steering column elements (12,13);

connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space, said fluid chamber (25,26) being selectively connectable by control valve means (6) with a fluid supply source (2) or with a fluid receiving space (3) or being separable from both said fluid supply source (2) and said fluid receiving space (3), said fluid receiving space (3) being a low pressure reservoir, a pump being provided between said low pressure reservoir and said fluid supply source, said steering column arrangement (7) comprising a pressure tube (12) having an axis substantially coinciding with said axis of said steering column arrangement (7) with two ends, a piston rod member (13) axially extending through one of said two ends and a piston unit (15) combined with said piston rod member (13) within said pressure tube (12), said piston unit (15) being sealingly engaged with an inner circumferential surface of said pressure tube (12) and confining said at least one fluid chamber (25,26) together with said pressure tube (12).

96. A telescopically length variable steering column arrangement for a motor vehicle having an axis and comprising:

at least two telescopically and torque transmittingly interengaging steering column elements (12,13) rotatably mounted in a bearing system (24,23);

a steering wheel allocated to one (13) of said steering column elements (12,13) for connection with steering means (31) controlling the steering movement of at least one vehicle wheel;

fluid operated locking means for locking said steering column elements (12,13) in a plurality of selectable relative axial positions;

said fluid operated locking means comprising means defining at least one fluid chamber (25,26) of variable volume within at least one (12) of said at least two steering column elements (12,13);

connection means (19,30) being provided for filling said fluid chamber (25,26) with an operational fluid or permitting outflow of said operational fluid from said fluid chamber (25,26) or preventing fluid exchange between said fluid chamber (25,26) and at least one further fluid containing space, said fluid chamber (25,26) being selectively connectable by control valve means (6) with a fluid supply source (2) or with a fluid receiving space (3) or being separable from both said fluid supply source (2) and said fluid receiving space (3), said at least one fluid chamber (25,26) being connectable with a fluid supply source (2) and a fluid receiving space (3) through at least one pivotal fluid connection means (33,18) substantially coaxial with said axis.

* * * * *

UNITED STATES PATENT AND TRADEMARK OFFICE
CERTIFICATE OF CORRECTION

PATENT NO. : 5,242,195
DATED : September 7, 1993
INVENTOR(S) : Reiner Wendling

It is certified that error appears in the above-identified patent and that said Letters Patent is hereby corrected as shown below:

```
Col.  9, line 15, "and" should read --and a--;
Col. 10, line 53, "portion tube" should read --pressure tube--;
Col. 11, line 30, "baring" should read --bearing--;
Col. 12, line 65, "with two ends" should read --and two ends--;
Col. 13, line 39, "and on" should read --and--;
Col. 14, line 38, "portion tube" should read --pressure tube--;
Col. 16, line 39, "92)" should read --(2)--;
Col. 16, line 60, "portion tube" should read --pressure tube--;
Col. 19, line 1, "with two ends" should read --and two ends--;
Col. 19, line 15, "portion tube" should read --pressure tube";
Col. 19, line 59, "with two ends" should read --and two ends--;
Col. 20, line 42, "separable with" should read --separable from--;
Col. 22, line 20, "with two ends" should read --and two ends--;
```

Signed and Sealed this

Fourteenth Day of March, 1995

BRUCE LEHMAN

*Attest:*

*Attesting Officer*          *Commissioner of Patents and Trademarks*